(12) United States Patent
Al et al.

(10) Patent No.: US 9,888,101 B2
(45) Date of Patent: Feb. 6, 2018

(54) MOBILE DEVICE

(71) Applicant: Xiaomi Inc., Beijing (CN)

(72) Inventors: Lixin Al, Beijing (CN); Kesheng Yan, Beijing (CN); Jinchao Li, Beijing (CN); Shaoxing Hu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/133,195

(22) Filed: Apr. 19, 2016

(65) Prior Publication Data

US 2016/0316047 A1    Oct. 27, 2016

(30) Foreign Application Priority Data

Apr. 21, 2015  (CN) .......................... 2015 1 0191850

(51) Int. Cl.
*H04B 1/3827* (2015.01)
*H04M 1/02* (2006.01)
*G06F 1/16* (2006.01)

(52) U.S. Cl.
CPC ........ *H04M 1/0266* (2013.01); *G06F 1/1626* (2013.01); *G06F 1/1637* (2013.01); *H04B 1/3827* (2013.01)

(58) Field of Classification Search
CPC .. H04M 1/0266; H04M 1/026; H04M 1/0249; H04M 1/0264; H04M 1/185; H04B 1/3827; H05K 5/0017; Y10T 29/49002; Y10T 29/49826; G03B 17/02
See application file for complete search history.

(56) References Cited

U.S. PATENT DOCUMENTS

| | | |
|---|---|---|
| 2009/0290088 A1 | 11/2009 | Kwak |
| 2012/0050988 A1 | 3/2012 | Rothkopf et al. |
| 2012/0250276 A1 | 10/2012 | Nakajima |
| 2013/0107168 A1 | 5/2013 | Tang et al. |
| 2013/0321293 A1 | 12/2013 | Park et al. |
| 2014/0193606 A1* | 7/2014 | Kwong .................. C30B 29/20 428/138 |

(Continued)

FOREIGN PATENT DOCUMENTS

| | | |
|---|---|---|
| CN | 101813848 A | 8/2010 |
| CN | 102506350 A | 6/2012 |
| CN | 202955582 U | 5/2013 |
| EP | 1 360 883 | 7/2002 |

(Continued)

OTHER PUBLICATIONS

International Search Report of PCT Application No. PCT/CN2015/090661 dated Jan. 27, 2016 (5 pages).

(Continued)

*Primary Examiner* — James Yang
(74) *Attorney, Agent, or Firm* — Finnegan, Henderson, Farabow, Garrett & Dunner LLP (57) ABSTRACT

A mobile device is disclosed. The mobile device includes a frame structure including a side edge frame and a horizontal baffle, the side edge frame forming side edges of the mobile device, the horizontal baffle including a rim connected with interior walls of the side edge frame; and a screen module including side edges sized to fit in a space surrounded by the interior walls of the side edge frame, a bottom surface of the screen module being connected with an upper surface of the horizontal baffle, each of the side edges of the screen module being attached to a corresponding interior wall of the side edge frame.

10 Claims, 7 Drawing Sheets

(56) References Cited

U.S. PATENT DOCUMENTS

2015/0043141 A1* 2/2015 Pegg ............... H04M 1/026
361/679.26
2015/0198864 A1* 7/2015 Havskjold .......... G03B 17/02
455/556.1

FOREIGN PATENT DOCUMENTS

| EP | 2 640 040 A1 | 9/2013 |
|----|----|----|
| EP | 2 819 385 A1 | 12/2014 |
| JP | 2013073009 A | 4/2013 |
| JP | 2013541723 A | 11/2013 |
| JP | 2014006345 A | 1/2014 |
| JP | 2014529105 A | 10/2014 |
| KR | 10-1322312 | 10/2013 |
| KR | 101463218 B1 | 11/2014 |
| KR | 20150024920 A | 3/2015 |
| RU | 2013122630 A | 11/2014 |
| WO | WO 02/054846 A1 | 7/2002 |
| WO | WO 2014/042062 A1 | 3/2014 |
| WO | WO 2014/175172 A1 | 10/2014 |

OTHER PUBLICATIONS

Office Action dated Feb. 6, 2017, in counterpart Russian Application No. 2015155316/28(085339) and English translation thereof.
Extended Search Report for European Application No. 16150085.5 from the European Patent Office, dated Sep. 1, 2016.
English version of International Search Report of PCT Application No. PCT/CN2015/090661, dated Jan. 27, 2016, issued by the ISA/CN—State Intellectual Property Office of the P.R. China.

* cited by examiner

Related Art

MOBILE DEVICE

CROSS-REFERENCE TO RELATED APPLICATIONS

This application is based upon and claims priority to Chinese Patent Application 201510191850.9, filed Apr. 21, 2015, the entire contents of which are incorporated herein by reference.

TECHNICAL FIELD

The present disclosure relates to the technical field of electronic terminals, and more particularly, to a mobile device.

BACKGROUND

As the screen size of a mobile device increases, the size of the mobile device has to increase. A larger screen may provide a better visual effect to a user. Challenges of providing larger screens and better user experiences remain as the screen size increases.

SUMMARY

According to a first aspect of the present disclosure, there is provided a mobile device. The mobile device includes a frame structure including a side edge frame and a horizontal baffle, the side edge frame forming side edges of the mobile device, the horizontal baffle including a rim connected with interior walls of the side edge frame; and a screen module including side edges sized to fit in a space surrounded by the interior walls of the side edge frame, a bottom surface of the screen module being connected with an upper surface of the horizontal baffle, each of the side edges of the screen module being attached to a corresponding interior wall of the side edge frame.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
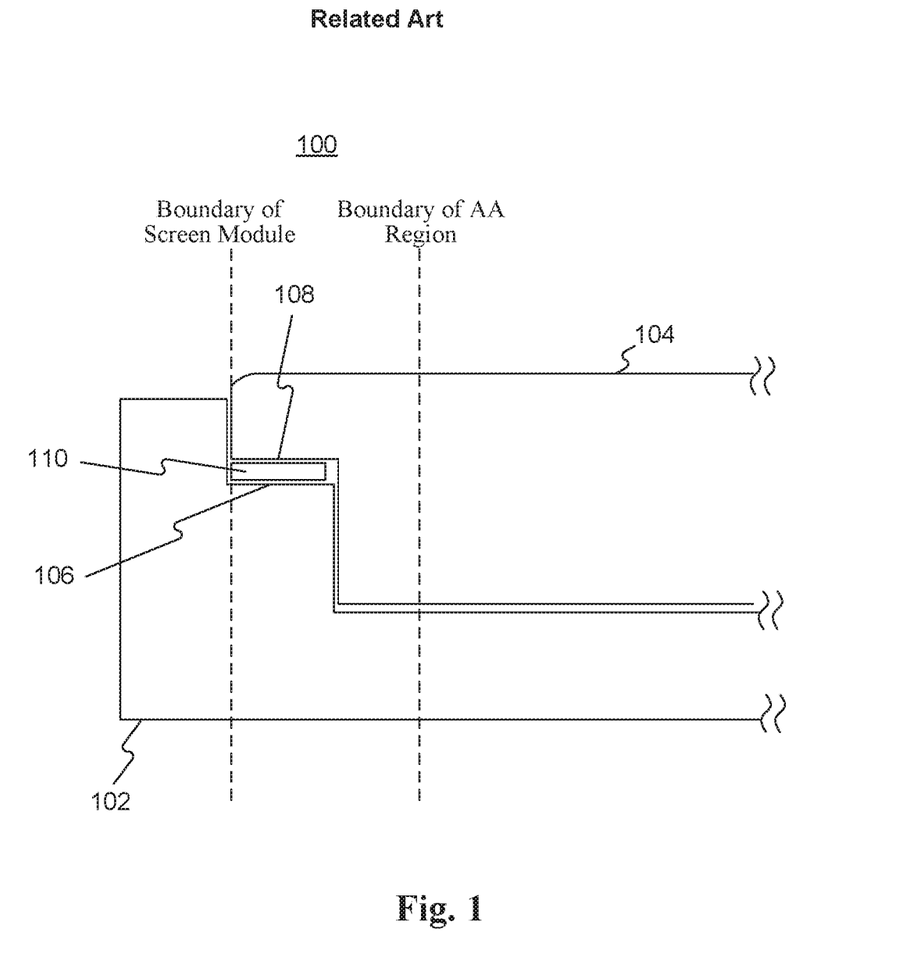
FIG. 1 is a structural diagram of a mobile device, according to the related art.

FIG. 1 is an exemplary structural diagram showing a portion of a mobile device 100 according to the related art. As shown in FIG. 1, a frame structure 102 is provided to be assembled with a screen module 104. The frame structure 102 includes a stepped structure 106 for placing the screen module 104 thereon. The stepped structure 106 is fitted with a raised structure 108 on a rim of the screen module 104. An adhesive layer 110 is disposed between the upper surface of the stepped structure 106 and the lower surface of the raised structure 108 to secure both structures together. However, due to the existence of raised structure 108 on the rim of the screen module 104, a width between the boundaries of an AA (Active Area) region and the screen module 104 is relatively large, which decreases an occupying percentage of the screen relative to the mobile device 100.

Therefore, the present disclosure may solve the technical problems in the related art as detailed below.

Figure 2:
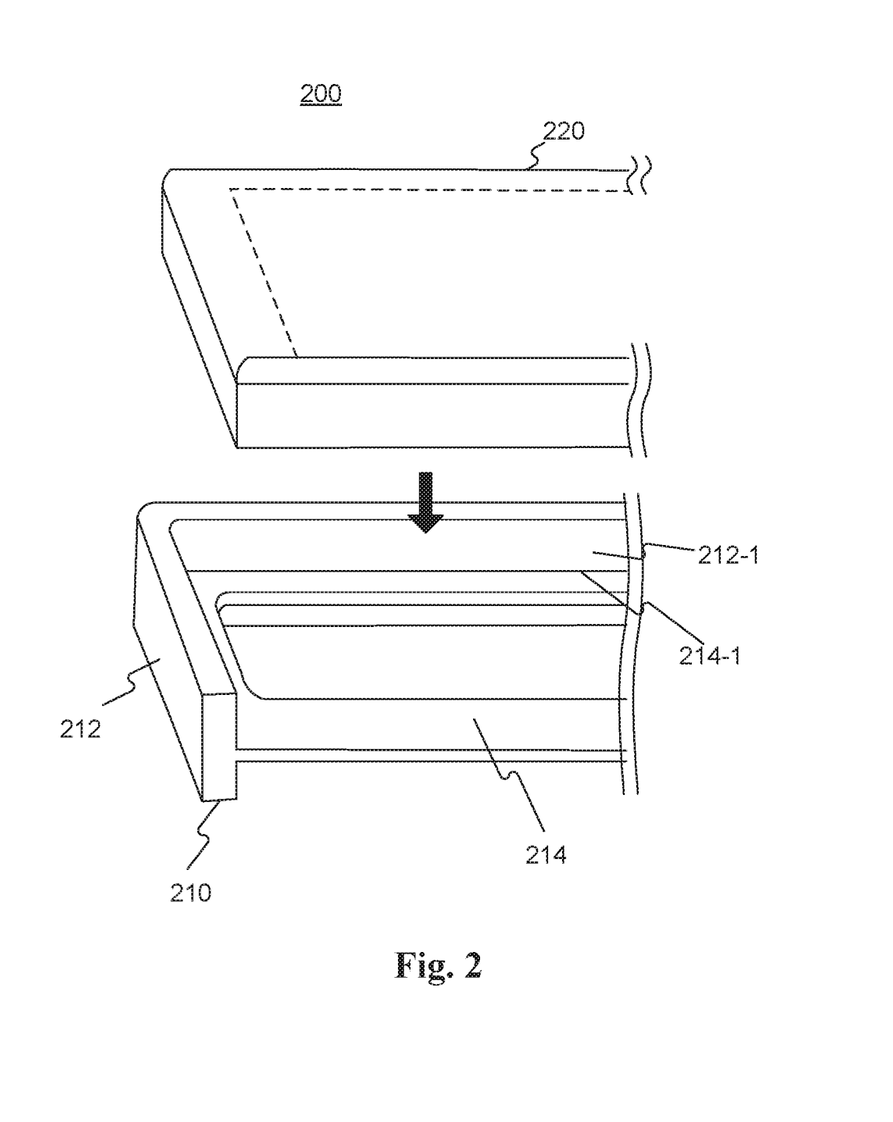
FIG. 2 is a structural diagram of a mobile device, according to an exemplary embodiment.

FIG. 2 is an exemplary structural diagram showing a mobile device 200 according to embodiments of the present disclosure. As shown in FIG. 2, the mobile device 200 may include a frame structure 210 and a screen module 220.

The frame structure 210 includes a side edge frame 212 forming the side edges of the mobile device 200 and a horizontal baffle 214 that has a rim portion 214-1 connected to the interior wall 212-1 of the side edge frame 212 and has no stepped structure adjacent to the rim portion 214-1. In the illustrated embodiment, the horizontal baffle 214 is a flat member that extends to the interior wall 212-1 of the side edge frame 212.

Figure 3:
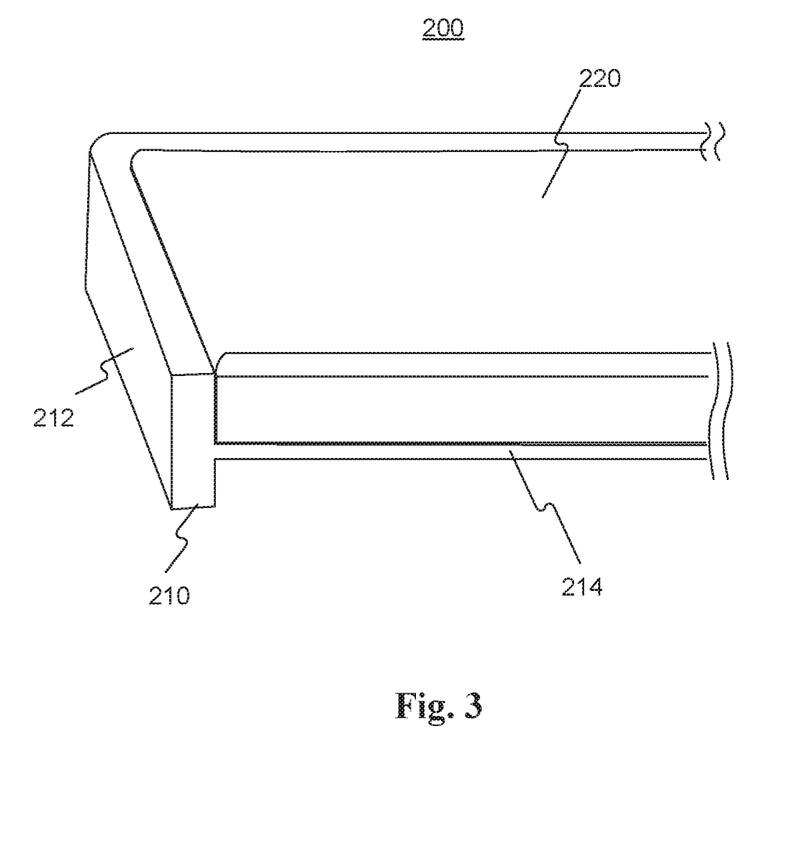
FIG. 3 is a structural diagram of another mobile device, according to an exemplary embodiment.

The screen module 220 includes side edges sized to fit the space surrounded by the interior wall 212-1 of the side edge frame 210. The bottom surface of the screen module 220 is connected to the upper surface of the horizontal baffle 214 when the screen module 220 is assembled with the frame structure 210, to form an assembled structure as shown in FIG. 3. Further, each of the side edges of the screen module 220 is attached to the corresponding interior wall 212-1 of the side edge frame 212.

In the illustrated embodiment, those skilled in the art should appreciate that since the mobile device 200 has a thickness much less than its length and width, the upper, lower, left and right side walls with respect to the thickness may be referred as "side edges", so as to show the differences between the side walls and the front and back surfaces.

Figure 4:
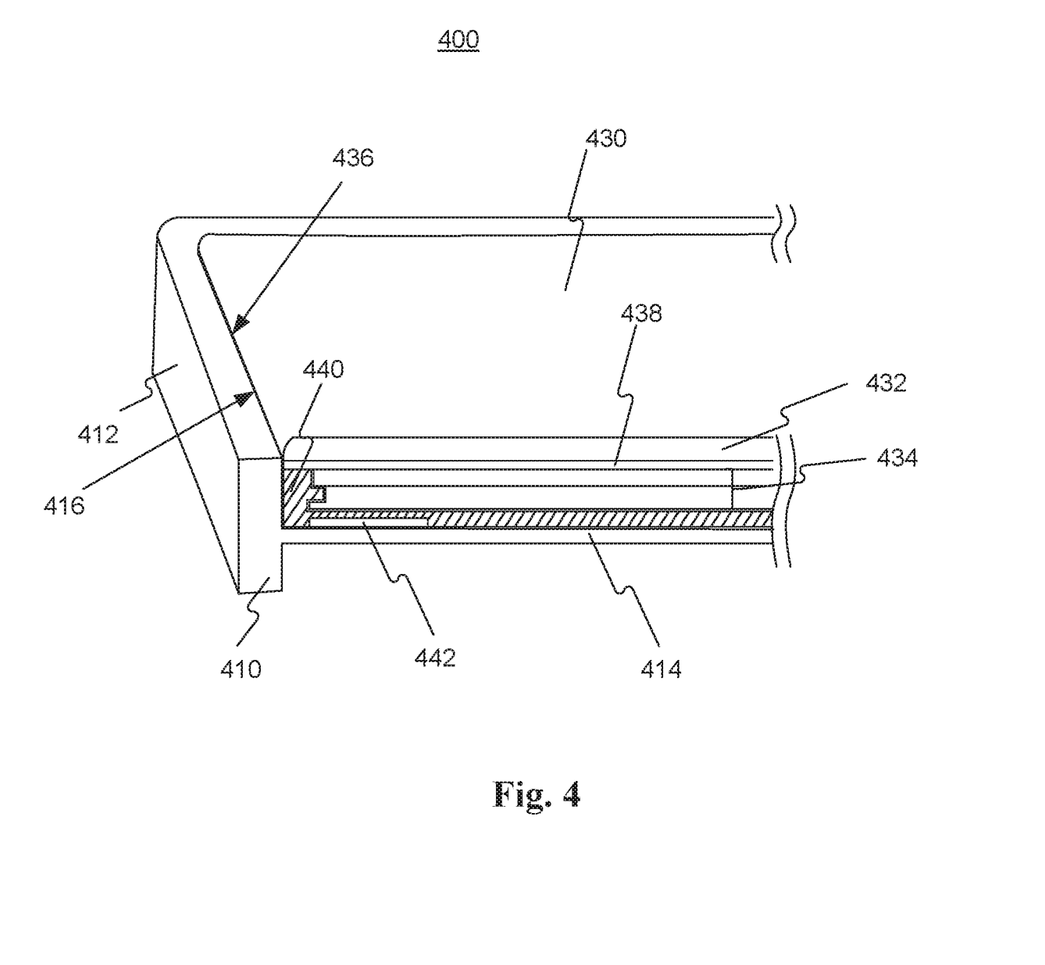
FIG. 4 is a structural diagram of still another mobile device, according to an exemplary embodiment.

FIG. 4 is an exemplary structural diagram of still another mobile device 400 according to embodiments of the present disclosure. As shown in FIG. 4, the mobile device 400 includes a frame structure 410 and a screen module 430. The frame structure 410 includes a side edge frame 412 and a horizontal baffle 414 connected to the side edge frame 412. The screen module 430 includes a cover panel 432, such as a glass panel, and a display panel 434, such as a liquid crystal display (LCD) panel or an organic light-emitting diode (OLED) panel.

As shown in FIG. 4, the side edges of the cover panel 432 are attached to the interior walls of the side edge frame 412. Only the left and top portions of the mobile device 400 are shown in FIG. 4 in the illustrated embodiment. For example, a rim 436 of the side edge of the cover panel 432 is connected to an upper rim 416 of the left interior wall of the side edge frame 412. Similar structures may be present between other side edges of cover panel 432 and corresponding interior walls of the side edge frame 412.

Figure 5:
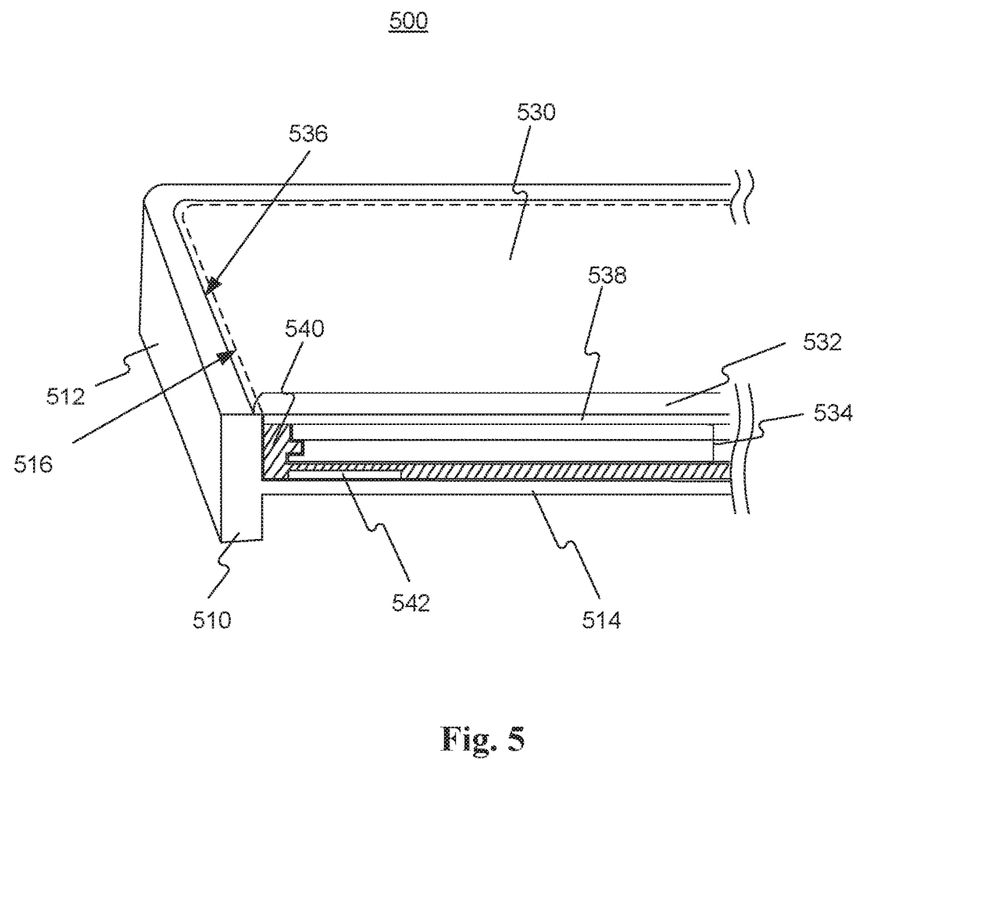
FIG. 5 is a structural diagram of still another mobile device, according to an exemplary embodiment.

FIG. 5 is an exemplary structural diagram of still another mobile device 500 according to embodiments of the present disclosure. As shown in FIG. 5, the mobile device 500 includes a frame structure 510 and a screen module 530. The frame structure 510 includes a side edge frame 512 and a horizontal baffle 514 connected to the side edge frame 512. The screen module 530 includes a cover panel 532, such as a glass panel, and a display panel 534, such as an LCD) panel or an OLED panel.

The bottom surface of the cover panel 532 is arranged at the substantially same level as the top surface of the side edge frame 512. A rim portion of the bottom surface of the cover panel 532 is extended to overlap a portion of the top surface of the side edge frame 512, such that the bottom surface of the cover panel 532 covers the top surface of the side edge frame 512. As shown in FIG. 5, an outer rim 536 of the left side edge of the cover panel 532 is positioned outside of an inner rim 516 of the side edge frame 512, such that a gap between the frame structure 510 and the screen module 530 is shielded by the cover panel 532, so as to prevent dusts from falling into the gap and improve the appearance of the mobile device 500.

Referring back to FIG. 4, the screen module 430 further includes the display panel 434 which is attached to the bottom surface of the cover panel 432 by, for example, a transparent adhesive layer 438 such as an adhesive tape, an optical adhesive tape, or a glue.

In an exemplary embodiment, the display panel 434 may be sized smaller than the cover panel 432, such that the display panel 434 is adhered to a central region of the bottom surface of the cover panel 432. Thus, if the rim 436 of the side edge of the cover panel 432 is connected with the upper rim 416 of the interior wall of the side frame 412 when the screen module 430 is assembled with the frame structure 410, a gap is generated between the display panel 434 and the interior wall of the side frame 412.

In the illustrated embodiment, the screen module 430 may further include a display panel holder 440, as shown in FIG. 4, for enclosing the side edges and bottom surface of the display panel 434. An interior surface of the display panel holder 440 is fitted with an exterior surface of the display panel 434, and an exterior surface of the display panel holder 440 is fitted with an interior wall of the side frame 412 and an upper surface of the horizontal baffle 414, to fill the gap among the side frame 412, the horizontal baffle 414, and the display panel 434. The side edges of the display panel holder 440 is attached with the interior walls of the side frame 412, and the bottom surface of the display panel holder 440 is connected with the upper surface of the horizontal baffle 414 when the screen module 430 is assembled with the frame structure 410. The display panel holder 440 may be connected to the upper surface of the horizontal baffle 414 by means of an adhesive, mechanical latch, thermal adhesive connection, or etc., forming, for example, an adhesive layer 442 between the bottom surface of the display panel holder 440 and the upper surface of the horizontal baffle 414.

Similarly, referring to FIG. 5, the screen module 530 further includes the display panel 534 which is attached to the bottom surface of the cover panel 532 by, for example, a transparent adhesive layer 538 such as an adhesive tape, an optical adhesive tape, or a glue.

In an exemplary embodiment, the display panel 534 may be sized smaller than the cover panel 532, such that the display panel 534 is adhered to a central region of the bottom surface of the cover panel 532. Thus, if the rim 536 of the side edge of the cover panel 532 is connected with the upper rim 516 of the interior wall of the side frame 512 when the screen module 530 is assembled with the frame structure 510, a gap is generated between the display panel 534 and the interior wall of the side frame 512.

In the illustrated embodiment, the screen module 530 may further include a display panel holder 540, as shown in FIG. 5, for enclosing the side edges and bottom surface of the display panel 534. An interior surface of the display panel holder 540 is fitted with an exterior surface of the display panel 534, and an exterior surface of the display panel holder 540 is fitted with an interior wall of the side frame 512 and an upper surface of the horizontal baffle 514, to fill the gap among the side frame 512, the horizontal baffle 514, and the display panel 534. The side edges of the display panel holder 540 is attached with the interior walls of the side frame 512, and the bottom surface of the display panel holder 540 is connected with the upper surface of the horizontal baffle 514 when the screen module 530 is assembled with the frame structure 510. The display panel holder 540 may be connected to the upper surface of the horizontal baffle 12 by means of an adhesive, mechanical latch, thermal adhesive connection, or etc., forming, for example, an adhesive layer 542 between the bottom surface of the display panel holder 540 and the upper surface of the horizontal baffle 514.

In another exemplary embodiment, other than the structure shown in FIGS. 4 and 5, the display panels 434 and 534 may be sized to fit to the side frames 412 and 512 and the horizontal baffles 414 and 514 of the frame structures 410 and 510, so as to omit the display panel holders 440 and 540 from the screen modules 430 and 530, respectively.

Figure 6A:
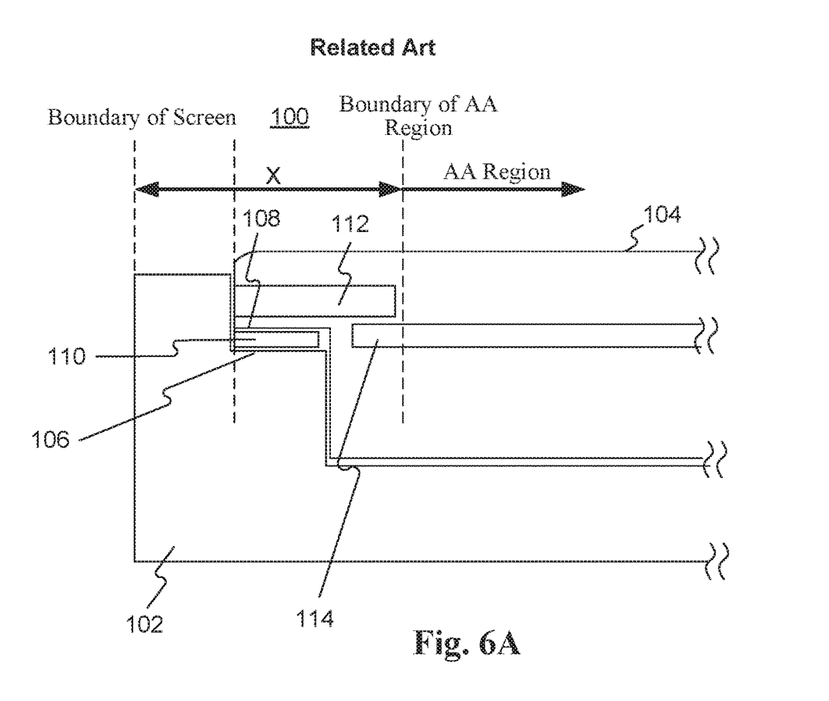
FIG. 6A is a cross-sectional view of a portion of the mobile device shown in FIG. 1, according to the related art.
Figure 6B:
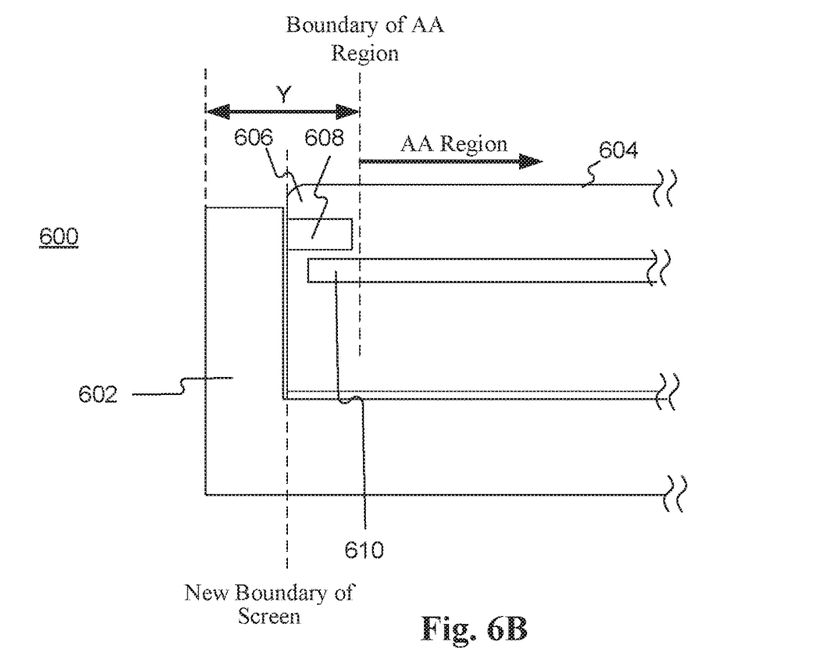
FIG. 6B is a structural diagram of still another mobile device, according to an exemplary embodiment.

FIG. 6A shows a more detailed cross-sectional view of a portion of the mobile device 100 (FIG. 1) in the related art, and FIG. 6B shows a cross-sectional view of a portion of a mobile device 600 according to an embodiment of the present disclosure. Referring to FIG. 6A, the screen module 104 is placed on the stepped structure 106 of the frame structure 102. The screen module 104 includes a light-blocking strip 112 and an LCD panel 114, where a portion of the light-blocking strip 112 is disposed above the stepped structure 106 while the LCD panel 114 is disposed not to overlap the step structure 106. The structures in FIG. 6A result in a non-display area having a width X from the edge of the frame structure 102 to the boundary of the AA region.

As shown in FIG. 6B, the mobile device 600 includes a frame structure 602 and a screen module 604. The screen module 604 includes a cover panel 606, such as a glass panel, a light-blocking strip 608, and a display panel 610, such as an LCD or OLED panel. Referring to FIGS. 6A and 6B, by removing the stepped structure 106 in FIG. 6A, the distance between the boundary of the screen module 604 and the boundary of the AA region can be shortened in the mobile device 600 (FIG. 6B), such that a width Y from the edge of the frame structure 602 and the boundary of the AA region can be shortened (X>Y) to reduce the non-display region at the rim of the mobile device 600, without affecting the display function of the display panel 610.

According to embodiments of the present disclosure, the width of the light-blocking strip 608 and the cover panel 606 are reduced without varying the area of the AA region, such that the total area of the front surface of the mobile device 600 is reduced, so as to relatively increase the ratio of the AA region to the total area of the front surface of the mobile device 600, to improve the appearance of the mobile device 600.

Consistent with the embodiments of the present disclosure, the shape of the rims of the cover panels 432, 532, and 606 may be in any form. For example, in an exemplary embodiment as shown in FIGS. 2-4, the upper corner of rims 436 and 636 of the cover panel 430 and 530 are chamfered to avoid cutting the user.

Figure 7:
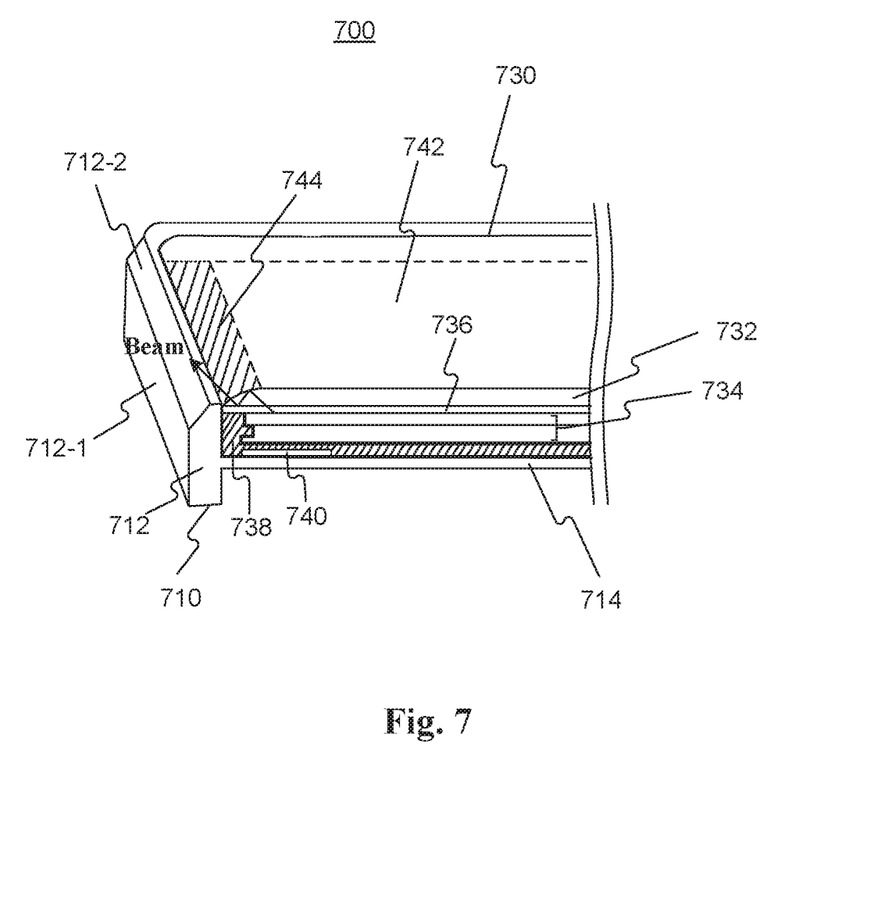
FIG. 7 is a structural diagram of still another mobile device, according to an exemplary embodiment.

FIG. 7 shows a portion of a mobile device 700, consistent with embodiments of the present disclosure. The mobile device 700 includes a frame structure 710 and a screen module 730. The screen module 730 includes a cover panel 732, such as a glass panel, a display panel 434, such as an LCD or OLED panel, an attaching layer 736 that couples the cover panel 732 to the display panel 734, a display holder 738 that holds the display panel 734, and an adhesive layer 740 that adheres the display holder 738 to a horizontal baffle 714 of the frame structure 710. The screen module 730 includes an AA region 742 corresponding to the display panel 734 disposed at a central region of the bottom surface of the cover panel 732. The screen module 730 further includes an edge region 744 formed between the rim of cover panel 732 and the AA region 742. Further, a light-blocking strip (not shown in the figures) may be adhered into the edge region 744.

In some embodiments, a portion of the upper surface of the cover panel 732 corresponding to the edge region 744 may have an arced shape, such that a light beam from the AA region 742 may be reflected to the edge region 744, as shown in FIG. 7. In the illustrated embodiment, because the light-blocking strip is disposed at the edge region 744, a black (or other color) region exists at the edge region of the cover panel 732. The light beam from the AA region 742 can be reflected and/or refracted by adjusting the arced angle of the surface at the edge region 744 of the cover panel 732, so as to impair the visual difference between the black region and the image displayed at the AA region 742, such that the existence of the black region is visually reduced.

In the exemplary embodiments shown in FIGS. 2-5, the exterior surface of the side edge frame 212, 412, or 512 of the frame structure 210, 410, or 510 may be a vertical side wall. In some embodiments, as shown in FIG. 7, a side edge frame 712 of the frame structure 710 of the mobile device 700 may have an arc shape so that the exterior surface of side edge frame 712 includes a vertical side surface 712-1 and an inclined or arced surface 712-2 adjacent to the cover panel 732.

The frame structure 710 may be strengthened by protruding outwards, allowing the mobile device 700 to withstand impacts or pressures when being dropped or pressed and reducing potential damages to the mobile device 700. As shown in FIG. 7, in an exemplary embodiment, the protruding portion of the frame structure 710 may form the vertical side surface 712-1 in the vertical direction, and the inclined or arced surface 712-2 is formed between the rim of the surface 712-1 and a rim of the top surface of the side edge frame 712.

As known from the above embodiments, the adhesive layer 110 formed between the rim region of the screen module 104 and the frame structure 102 in the related art is eliminated. As shown in FIGS. 2-7, this is achieved by adhering the bottom surface of the screen module to the frame structure, allowing more space to be occupied by the screen module without varying the size of the frame structure, so as to increase an occupying percentage of the display region relative to the mobile device, which helps to improve user experience.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and embodiments be considered as exemplary only, with a true scope and spirit of the invention being indicated by the following claims.

It will be appreciated that the present invention is not limited to the exact structure that has been described above and illustrated in the accompanying drawings, and that various modifications and changes can be made without departing from the scope thereof. It is intended that the scope of the invention should only be limited by the appended claims.

What is claimed is:
1. A mobile device, comprising:
 a frame structure including a side edge frame and a horizontal baffle, the side edge frame forming side edges of the mobile device, the horizontal baffle including a rim connected with interior walls of the side edge frame; and
 a screen module including side edges sized to fit in a space surrounded by the interior walls of the side edge frame, a bottom surface of the screen module being connected with an upper surface of the horizontal baffle, each of the side edges of the screen module being attached to a corresponding interior wall of the side edge frame, wherein the screen module comprises:
 a cover panel having side edges that are attached to the interior walls of the side edge frame, and a rim of the side edges of the cover panel is connected with a rim of the interior walls of the side edge frame;
 a display panel adhered to a bottom surface of the cover panel; and
 a display panel holder enclosing side edges and a bottom surface of the display panel,
 wherein an interior surface of the display panel holder is fitted with an exterior surface of the display panel, and an exterior surface of the display panel holder is fitted with an interior wall of the side edge frame and an upper surface of the horizontal baffle; and
 side edges of the display panel holder are attached to the interior walls of the side edge frame, and a bottom surface of the display panel holder is connected with the upper surface of the horizontal baffle.
2. The device of claim 1, wherein the display panel holder is connected with the upper surface of the horizontal baffle by one of an adhesive, a mechanical latch, or a thermal adhesive connection.
3. The device of claim 1, wherein the display panel includes an active area located at a region corresponding to a central region of the bottom surface of the cover panel, the cover panel including an edge region extending from the central region of the bottom surface; and wherein a light-blocking strip is disposed at the edge region of the cover panel.
4. The device of claim 3, wherein a portion of an upper surface of the cover panel corresponding to the edge region has an arced shape, such that a light beam from the active area is reflected to the edge region.

5. The device of claim 1, wherein the frame structure has a portion protruding outwards.

6. The device of claim 5, wherein the protruding portion of the frame structure forms a surface in a vertical direction, and an inclined or arced plane is formed between a rim of the surface and a rim of a top surface of the side edge frame.

7. A mobile device, comprising:
- a frame structure including a side edge frame and a horizontal baffle, the side edge frame forming side edges of the mobile device, the horizontal baffle including a rim connected with interior walls of the side edge frame; and
- a screen module including side edges sized to fit in a space surrounded by the interior walls of the side edge frame, a bottom surface of the screen module being connected with an upper surface of the horizontal baffle, each of the side edges of the screen module being attached to a corresponding interior wall of the side edge frame, wherein the screen module comprises:
- a cover panel having a bottom surface that is at a same level as a top surface of the side edge frame, a rim of the bottom surface of the cover panel extending towards the side edge frame, such that a portion of the bottom surface of the cover panel overlaps a portion of a top surface of the side edge frame;
- a display panel adhered to the bottom surface of the cover panel; and
- a display panel holder enclosing side edges and a bottom surface of the display panel, wherein:
- an interior surface of the display panel holder is fitted with an exterior surface of the display panel, and an exterior surface of the display panel holder is fitted with an interior wall of the side edge frame and an upper surface of the horizontal baffle; and
- side edges of the display panel holder are attached to the interior walls of the side edge frame, and a bottom surface of the display panel holder is connected with the upper surface of the horizontal baffle.

8. The device of claim 7, wherein the display panel holder is connected with the upper surface of the horizontal baffle by one of an adhesive, a mechanical latch, or a thermal adhesive connection.

9. The device of claim 7, wherein the display panel includes an active area located at a region corresponding to a central region of the bottom surface of the cover panel, the cover panel.

10. The device of claim 9, wherein a portion of an upper surface of the cover panel corresponding to the edge region has an arced shape, such that a light beam from the active area is reflected to the edge region.

* * * * *

UNITED STATES PATENT AND TRADEMARK OFFICE
CERTIFICATE OF CORRECTION

PATENT NO. : 9,888,101 B2
APPLICATION NO. : 15/133195
DATED : February 6, 2018
INVENTOR(S) : Lixin Ai et al.

It is certified that error appears in the above-identified patent and that said Letters Patent is hereby corrected as shown below:

In the Claims

Claim 9, Column 8, Lines 19-20, "cover panel, the cover panel." should read as --cover panel, the cover panel including an edge region extending from the central region of the bottom surface; and wherein a light-blocking strip is disposed at the edge region of the cover panel.--.

Signed and Sealed this
Fifteenth Day of May, 2018

Andrei Iancu
*Director of the United States Patent and Trademark Office*